March 6, 1928.
H. H. WOLFE
1,661,246
TRANSITION CAR COUPLING
Filed May 8, 1925
2 Sheets-Sheet 1
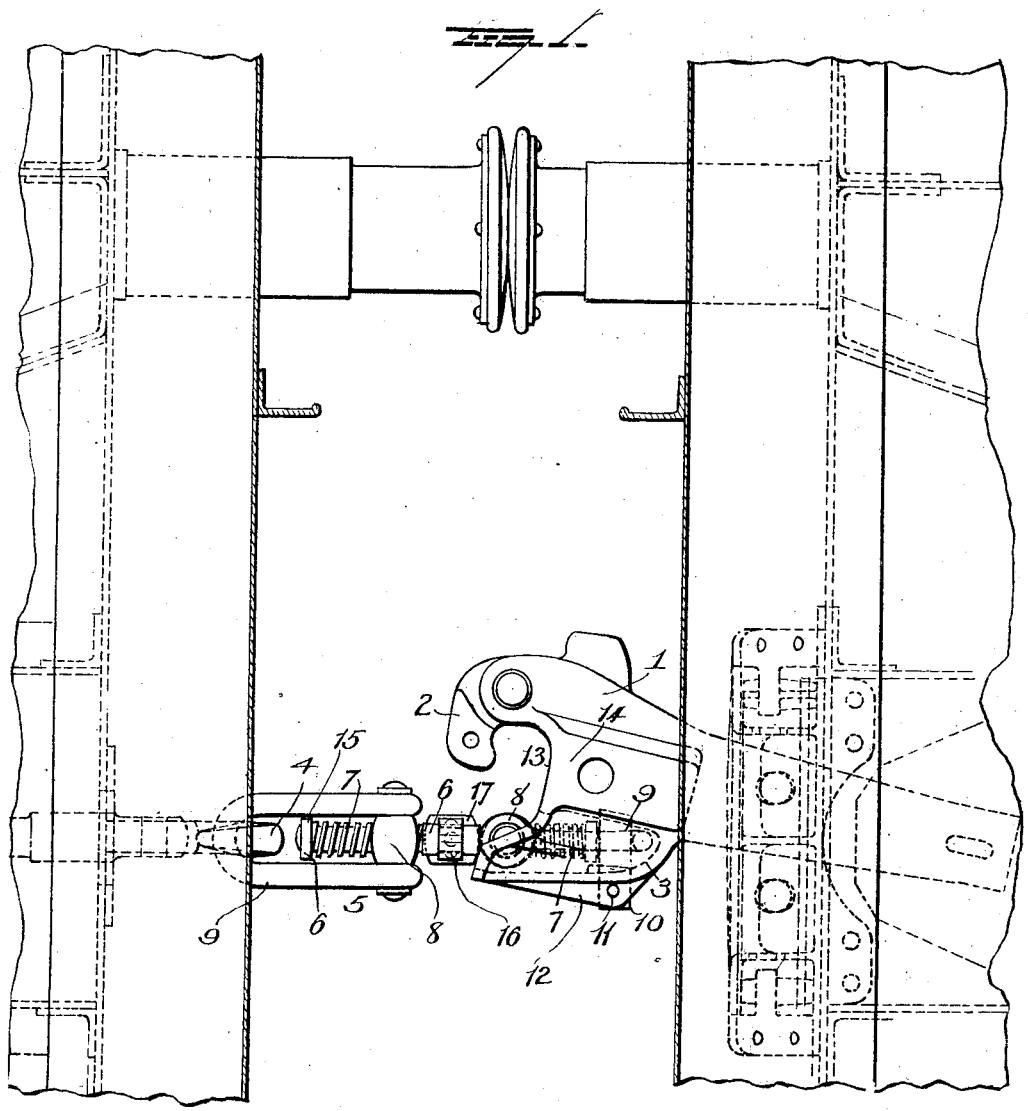
Inventor
H. H. Wolfe
By Seymour & Bright
Attorneys

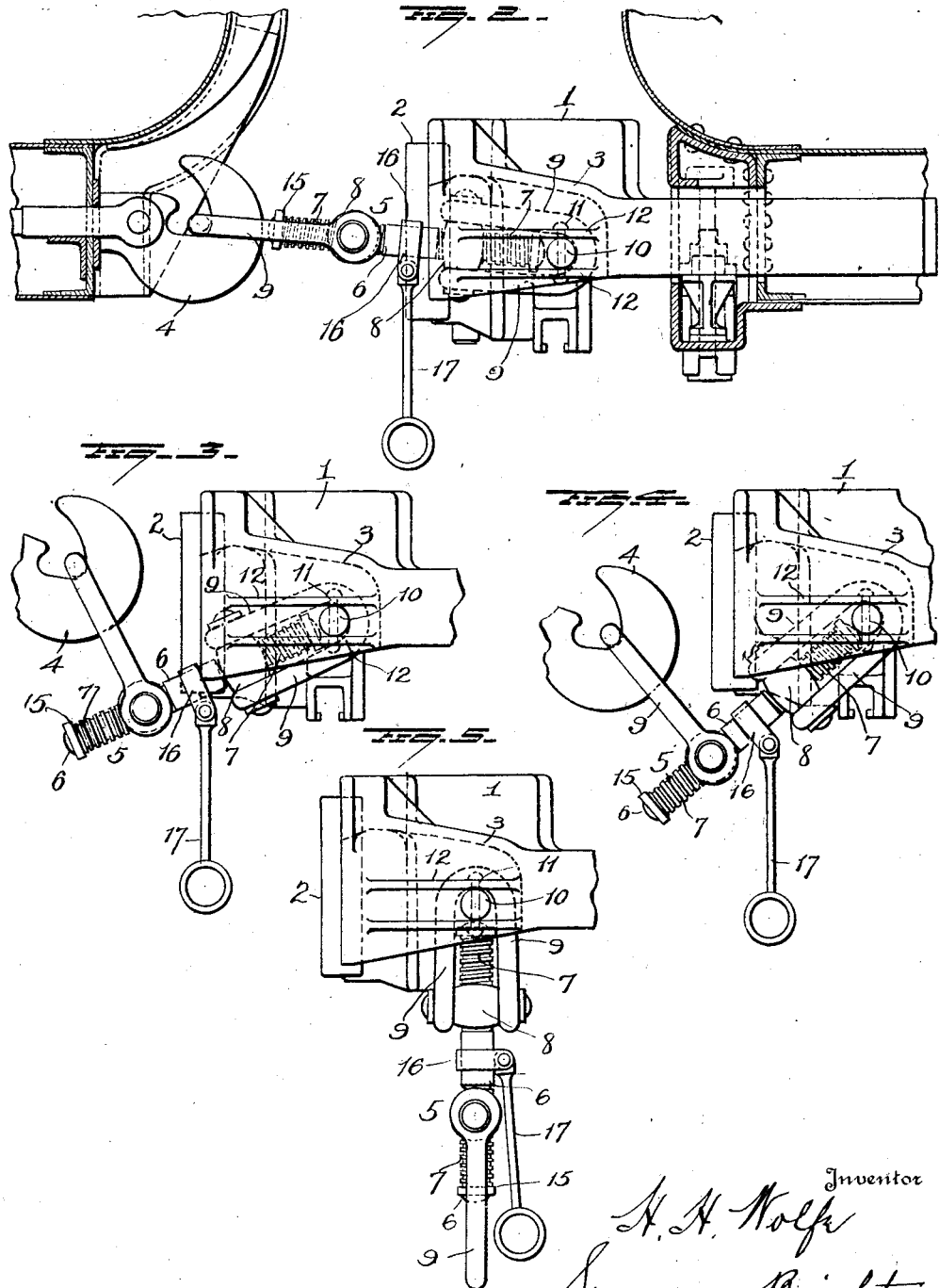

Patented Mar. 6, 1928.

1,661,246

UNITED STATES PATENT OFFICE.

HARRY HAMILTON WOLFE, OF COLUMBUS, OHIO, ASSIGNOR TO THE BUCKEYE STEEL CASTINGS COMPANY, OF COLUMBUS, OHIO.

TRANSITION CAR COUPLING.

Application filed May 8, 1925. Serial No. 28,878.

This invention relates to transition car couplings and provides a novel form of coupler whereby a coupler of the European hook type may be easily and effectually connected with an automatic coupler. The invention provides a device which may be readily assembled or disassembled but which cannot be easily lost, which will accommodate itself to the buffing position of the cars, and which will be out of the way when two cars equipped with automatic couplers are to be coupled. The invention is illustrated in the accompanying drawings and consists in certain novel features which will be hereinafter first fully described and then more particularly pointed out in the appended claims.

In the drawings, Figure 1 is a plan view of the invention applied in working position.

Figure 2 is a side elevation of the same.

Figure 3 is a side elevation showing how the device accommodates itself to the buffing position of the cars.

Figure 4 is a view similar to Figure 3 but showing a different load relation of the cars, and Figure 5 is a side elevation showing the position assumed by the device when the cars are uncoupled.

In the drawings, the reference numeral 1 indicates a drawhead having the usual knuckle 2 and a guard arm 3, and 4 indicates the hook portion of the hook type coupler. In accordance with the present invention, the guard arm is open at its front end and at its bottom thereby providing a chamber or recess in which the coupling device 5 is fitted and operates. The coupling device, indicated as an entirety by the reference numeral 5 consists of a rod 6 having its end portions threaded, as at 7, to be engaged by heads 8 upon the ends of which are swiveled yokes 9, the outer yoke being adapted to engage the hook coupler 4 as shown. The inner yoke fits within the recess or chamber of the guard arm 3 and is retained therein by a pin 10 inserted through the side of the arm and secured by a key 11 passed through its outer end and lugs or ribs 12 on the arm. By this arrangement, the buffing surface 13 and the lock housing 14 of the drawhead are not disturbed nor weakened so that the present relations of the working parts of the automatic coupler are maintained. The rod 6 is provided with stops 15 at its ends to prevent accidental removal of the yokes, and midway its ends is formed a clamp 16 to which is pivoted a lever or handle bar 17, said bar being adapted to fold against the connecting or coupling rod 6 or to extend radially therefrom. This lever or handle bar 17 is used for the purpose of screwing the coupling rod 6, which is threaded right and left, through the heads 8 thereby shortening or lengthening the device. The device must be extended before it can be applied on the hook and after it is applied it is shortened to bring about tension in the side buffer springs. This device is a part of the present hook coupling and when an automatic coupler is installed on a car the screw coupling is removed from the hook and secured to the automatic coupler as shown and described herein. The use of this device, in connection with the automatic coupler, allows the automatic coupler to be coupled up with the hook coupler while the cars are in motion, and when they are not coupled or both cars are equipped with automatic couplers it may depend from the drawhead out of the way, as shown in Figure 5. As the retaining and pulling pin 10 is located at one side of the longitudinal center line and back of the pulling face of the drawhead, there is no interference with the air hose connection.

To assemble the parts, one yoke 9 is inserted in the recess or chamber of the guard arm and the pin 10 then inserted through the side of the arm and through the yoke and locked by the key, rivet or bolt 11, the device being then ready for use. A reverse operation will disassemble the parts, and it will be readily noted that it is not necessary to place the car in a shop for either operation.

Should the cars come together while coupled, the yoke 9 and rod 6 will fold downwardly, as shown in Figures 3 and 4, so that no breakage or other damage to the parts will occur, and the roof of the recess in the guard arm is so located as to permit such movement of the coupler to accommodate the spring travel of the cars.

Having fully described my invention what I claim as new and desire to secure by Letters-Patent, is:

1. A transition coupler comprising a drawhead provided with a guard arm at one side of its transverse center, said guard arm having a recess opening through its front end and through its bottom, and a coupling member pivotally secured at its rear end within said recess.

2. An automatic coupler having a swinging knuckle at one side, a guard arm on the opposite side having a recess opening through its front end and through its bottom, and a coupling member pivotally secured at one end in said recess and held against lateral movement thereby.

In testimony whereof, I have signed this specification.

HARRY HAMILTON WOLFE.